[11] 3,779,458
[45] Dec. 18, 1973

[54] SELF-CHECKING DECISION LOGIC CIRCUIT

[75] Inventors: Herbert Yu-Pang Chang, Woodridge; Roger Alan Elliott, Plainfield, both of Ill.; Daniel John Senese, Freehold; Thomas Loyd Smith, Oceanport, both of N.J.

[73] Assignee: Bell Telephone Laboratories, Incorporated, Murray Hill, Berkeley Heights, N.J.

[22] Filed: Dec. 20, 1972

[21] Appl. No.: 316,876

[52] U.S. Cl. .......... 235/153 BG
[51] Int. Cl. .......... G06f 11/08
[58] Field of Search .......... 340/146.1 AB, 146.1 BA, 340/146.1 BE, 172.5; 235/153 AH, 153 BG

[56] References Cited

UNITED STATES PATENTS

| | | | |
|---|---|---|---|
| 3,523,279 | 8/1970 | Briley et al. | 340/146.1 BA |
| 3,541,507 | 11/1970 | Duke | 340/146.1 AB |
| 3,559,167 | 1/1971 | Carter et al. | 235/153 BG |
| 3,559,168 | 1/1971 | Carter et al. | 235/153 AH |

*Primary Examiner*—Charles E. Atkinson
*Attorney*—W. L. Keefauver et al.

[57] ABSTRACT

A self-checking decision logic circuit for making any one of a number of possible decisions based on selected bits stored in a check register. A true and a complement output of each cell of the check register are individually combined with corresponding true and complement outputs of a mask register to generate a decision signal via the complement outputs and a check signal via the true outputs. A controlled entity assumes one of two states responsive to the decision signal and generates a state signal indicative of its state. The check signal and state signal then are applied to a 1-out-of-n error checking circuit to check the validity of the decision operation.

14 Claims, 1 Drawing Figure

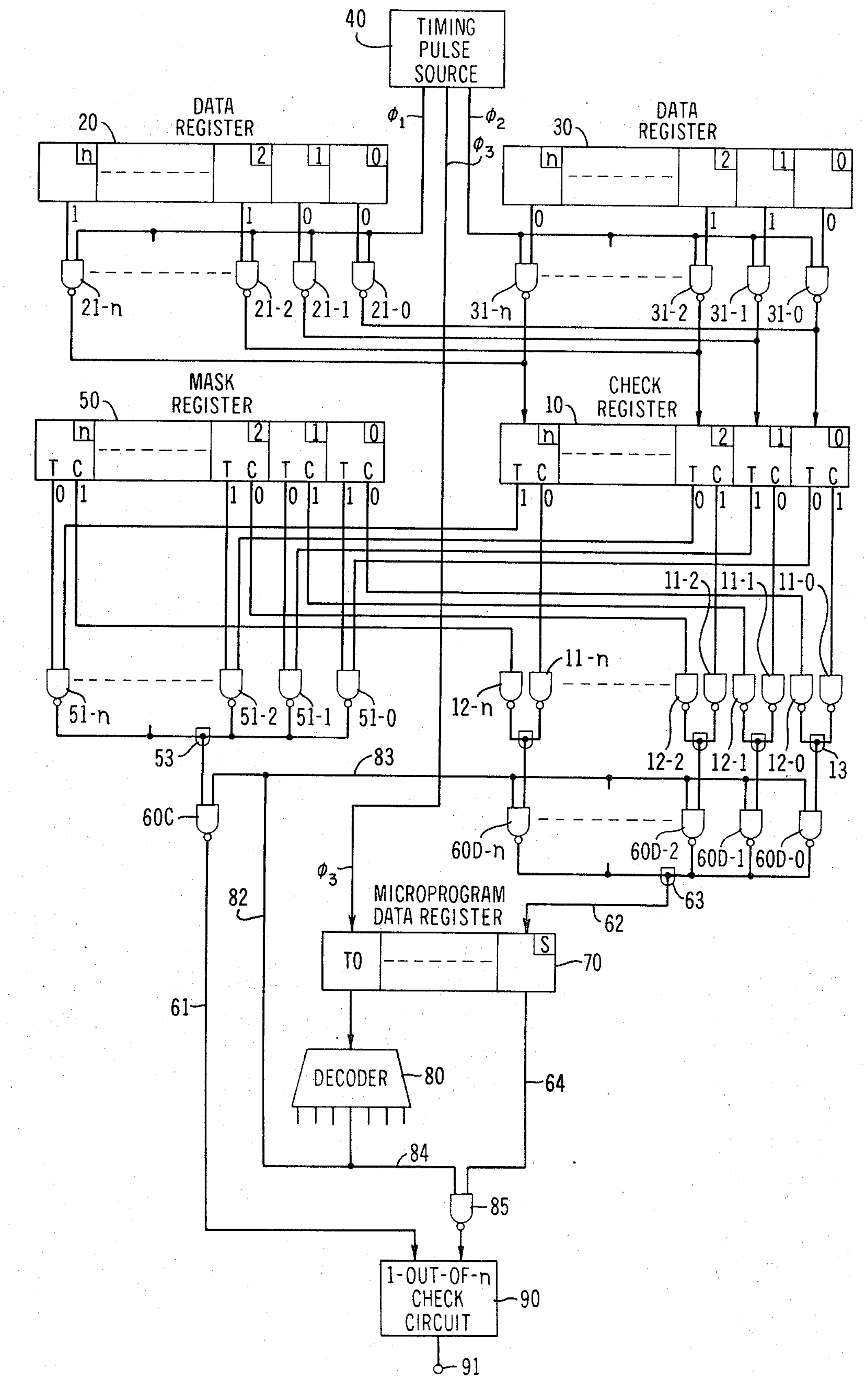
TIMING PULSE SOURCE
40
DATA REGISTER
20
DATA REGISTER
30
MASK REGISTER
50
CHECK REGISTER
10
MICROPROGRAM DATA REGISTER
70
DECODER
80
1-OUT-OF-n CHECK CIRCUIT
90
91
21-n 21-2 21-1 21-0
31-n 31-2 31-1 31-0
51-n 51-2 51-1 51-0
11-n 11-2 11-1 11-0
12-n 12-2 12-1 12-0
13
53
60C
60D-n 60D-2 60D-1 60D-0
61 62 63 64
82 83 84 85
T0
S

SELF-CHECKING DECISION LOGIC CIRCUIT

BACKGROUND OF THE INVENTION

This invention relates to logic circuits for data processing systems and the like and more particularly to such circuits having provision for error checking integrally incorporated therein.

Decision logic circuitry capable of generating a control signal as determined by the character of its input variables is universally employed in data processing and computer systems. As is known, these range from simple logic gates to highly complex logic function generators and numerous specific implementations of these circuits appear in the art. Whatever their function, such circuits must be completely reliable; any errors resulting from circuit element failures, for example, must be detected as they occur, not after they have been compounded in subsequent logic operations. In terms of an electronic telephone system central processor, for example, any failure in hardware will result in system degradation which in turn may be specifically manifested as loss of calls, improperly connected calls, or even total loss of service.

Heretofore, in data processing systems, including electronic telephone switching systems, the function of fault recognition and error diagnosis has been largely program implemented to attain the required level of reliability. Maintenance programs have been written to detect and diagnose component faults. Reliance on software for this important task in the past rested chiefly on its economic advantage; translated into hardware terms—memory has been less costly than logic circuitry. It, however, has the disadvantage that faults may not be concurrently detected. With the advent of the large scale circuit integration technology, it has now become economically feasible to accomplish the fault detection function entirely by means of gate logic circuitry. The added advantage with hardware implementation is that the faults can be recognized as they occur. This invention then is directed to the problem of providing a flexible, general purpose decision logic circuit which is capable of detecting circuit faults as they occur.

SUMMARY OF THE INVENTION

In one illustrative embodiment of the invention, selected bits of the contents of a check register are examined as to their value—or are ignored—and a logic decision is made based on that bit pattern. The logic circuitry is arranged so that the decision may rest on one, several, or all of the bits of the check register contents thereby providing a unique degree of flexibility. Although the logic decision may accomplish virtually any operation which may be required in a data processing system, in the exemplary application of the invention to be considered in detail hereinafter, the multibit decision determines the sequence of microprogram instructions to be read out of a microprogram memory as controlled by a control bit of a microprogram data register. In this connection it is assumed that three decision states are possible: decision-normal, as a result of which the normal processor instruction sequence is to be followed; decision-alter, as a result of which the microprogram data register control bit is set to a given value to alter the instruction sequence; and the state of no dicision made. The data register of the system also contains a TO bit field which specifies the destination register of the system to which the data being generated is to be transferred. This field is decoded by a TO field decoder to generate an output which is employed to enable the decision logic circuitry. This output is also combined with the output of the decision circuitry and the logic state of the data register control bit in a 1-out-of-$n$ check circuit to determine the correctness of the decision making operation.

Briefly and more specifically, in this illustrative embodiment, the contents of two registers of a data processing system are sequentially gated to the aforementioned check register to compare the corresponding bits of the two registers. The contents of a mask register then specifies which of the bits of the check register resulting from the comparison are to be observed to determined a particular decision state of the decision circuitry. The presence, for example, of a logical 1 in a bit position of the mask register determines that the corresponding bit position of the check register is to be examined for the value of its contents. Conversely in this example, the presence of a logical 0 in a mask register bit position determines that the corresponding bit position of the check register is to be ignored. Both the mask and the check register provide double-rail outputs making available both the true value and its complement for the contents of each bit position of the registers. Additionally, the check register comprises a toggle register whereby the contents of a bit cell is complemented by the presence of a logical 1 on its input terminal. This characteristic of the check register is advantageously employed in connection with other logic techniques to accomplish the decision making operation according to this invention, the all-zero state resulting from a successful match of the inputs being used as a basis. The check register for any bit position is initially set to contain a logical 0; if the first input to that position is a 1 then the position is toggled to a 1 in the manner of a typical toggle register. If the succeeding input matches in value that of the first, the check register position is return toggled to the logical 0 state. The corresponding bit position of the mask register, by containing a logical 1, determines that the foregoing check register bit position is to be checked.

This checking operation is accomplished by NAND gating the true outputs of the bit positions of the mask and check registers and NOR gating the associated complement outputs of the same bit positions. The NAND gate outputs of all the bit positions are multiplied together by transistor collector-tying and applied to a single, second stage NAND gate. The NOR gate outputs of all the bit positions are individually applied to inputs of a group of second stage NAND gates, the outputs of the gates being similarly multiplied together by transistor collector-tying to provide a single complement decision signal. An enable signal from the aforementioned decoder applied to the other inputs of the second stage NAND gates transmits the true decision signal from the former second stage NAND gate to the 1-out-of-$n$ check circuit and the complement decision signal from the latter second stage NAND gates to determine the contents of the control bit location of the microprogram data register. The value of the latter contents is also transmitted under the control of the enabling signal from the TO field decoder to the 1-out-of-$n$ check circuit.

The latter error checking circuit functions to ensure that only one of its inputs is active during any decision operation. No input active or more than one active causes the circuit to generate error signal. In the context of the illustrative decision making circuitry according to this invention here considered, the error checking circuit thus provides an indication that the control bit is set to a particular logical value whenever a decision-alter is made and is not set when a decision-normal is made. The hardware failure modes detected by the circuit of this invention are of the classical types; i.e., input open; output stuck at 0; output stuck at 1. For each of the decision states referred to in the foregoing general discussion, each of these faults is either detectable or would not affect a decision output. Both the decision hardware and the control hardware are thus checked each time a logic decision is made.

BRIEF DESCRIPTION OF THE DRAWING

The organization and operation of this invention together with its features and advantages will be better understood from a consideration of the detailed description of one illustrative decision making circuit according to its principles which follows when taken in conjunction with the accompanying drawing, the single FIGURE of which depicts in block symbol form one embodiment of this invention showing a self-checking decision making circuit in the context of the control of microprogram data register of a data processing system.

DETAILED DESCRIPTION

In the specific implementation of this invention assumed for purpose of description, a check register 10 having a plurality of bit storage cells, 0, 1, 2, . . . *n* is employed to compare the contents of two data storage registers 20 and 30. Each of the latter registers also provides for the storage of binary bits in corresponding storage cells 0, 1, 2, . . . *n*. The registers 20 and 30 may comprise any well-known means for storing binary data such as, for example, transistor flip-flop registers, single rail outputs of which provide voltage levels indicative of the cell contents. The outputs of register 20 are connected to respective first inputs of two-input NAND gates 21-0, 21-1, 21-2, . . . **21-*n* and the outputs of register 30 are connected to respective first inputs of two-inputs NAND gates 31-0, 31-1, 31-2, . . . 31-*n*. The other inputs of the gates 21 are connected together and to a $\phi_1$ terminal of a timing pulse source 40. Similarly, the other inputs of the gates 31 are connected together and to a $\phi_2$ terminal of the same timing pulse source. The outputs of corresponding gates 21 and 31 are connected together and to corresponding input terminals of check register 10**. The latter register is comprised of a plurality of transistor flip-flop storage cells of character well known in the art and is initially set to contain all logical 0's. In accordance with its toggle operation, the presence of a logical 1 on the input of a cell causes the contents of that cell to be "toggled," that is, complemented, whereas the presence of a logical 0 on the same input leaves the contents of that cell unaffected.

Each of the cells of check register 10 is provided with a double-rail output thus making available both the true and the complement value of the contents of a cell. In accordance with the principles of this invention, the check register 10 determines whether or not a match exists between the individual bit contents of the data registers 20 and 30. The contents of a mask register 50, on the other hand, determines which bit or bits in the bit positions of check register 10 will serve as the basis for any particular decision to be made. The mask register 50 also comprises a plurality of bit storage cells 0, 1, 2, . . . n each of which may also conveniently comprise a transistor flip-flop circuit well known in the art, each of which provides a double-rail output making available both the true and complement value of the contents of a cell as was the case in check register 20. Corresponding complement outputs of the storage cells of the check register 10 and mask register 50 are connected to respective single inputs of a plurality of inverter circuits 11-0, 11-1, 11-2, . . . 11-n and 12-0, 12-1, 12-2, . . . **12-*n*. Corresponding true outputs of the storage cells of the check register 10 and mask register 50 are paired for connection to respective input pairs of a plurality of NAND gates 51-0, 51-1, 51-2, . . . 51-*a*. One final stage of the decision circuitry of this invention comprises a grouping of NAND gates 60C and 60D-0, 60D-1, 60D-2, . . . 60D-*n*, each having a pair of input terminals. In accordance with the well-known transistor circuitry of typical NAND gates providing collector outputs, the collector outputs of pairs of the gates 11 and 12 are connected together as indicated by the symbols 13. Thus, for example, the single collector outputs of the gates 11-0 and 12-0 are connected together as indicated. The connected collector outputs are connected respectively to one input of each of the final stage NAND gates 60D. As will appear hereinafter, the result of the collector connections of the gate pairs 11 and 12 provides that if either of the outputs of a gate pair is low, that is, is indicative of a logical 0, the other output will also be drawn to the low voltage level. The single outputs of the gates 51 are similarly collector-tied as indicated by the symbol 53 and then connected to one input of the final stage NAND gate 60C. Collector-tying also combines the single outputs of the gates 60D as indicated by the symbol 63. The gates 60C and 60D** are enabled via their other inputs in a manner to be considered hereinafter.

The decision circuitry so far described is employed in the assumed illustrative adaptation of the invention to control the instruction sequence of a microprogram data register 70. The contents of that register include a control bit S and a TO bit field represented in the drawing by a single storage cell so indicated. The remaining contents of the register 70 are not important for an understanding of this invention and are not here specifically considered. The TO bit field of register 70 is decoded by a decoder 80 having a plurality of outputs only one of which is presently relevant to this description. The decoder 80 may also comprise any suitable circuitry known in the art which functions to convert a particular input bit field into a predetermined plurality of outputs as controlled by its wiring arrangement. The outputs may include, for example, destination locations for gating functions of the data processing system of which the invention is advantageously adapted for use. As such, one location is that of the enabling inputs of the final stage NAND gates 60C and 60D. An enabling signal is thus applied via conductors 82 and 83 to the second inputs of the gates 60C and 60D. At the same time the enabling signal is applied via a conductor 84 to one input of a two-input NAND gate 85.

Returning to the NAND gates 60C and 60D, their outputs are applied, respectively, to one input of a 1-out-of-*n* error checking circuit 90 via a conductor 61 and to an input of storage cell S of the microprogram data register 70 via a conductor 62. As will be considered more specifically hereinafter, the voltage level representative of the contents of storage cell S is transmitted via a conductor 64 to the other input of NAND gate 85. The output of the latter gate is applied is another input to the error checking circuit 90. Since the details of the latter circuit are readily envisioned by one skilled in the art, it need not be further considered other than specifying that if more or less than one of its inputs is active, a signal is conventionally generated and made available on an output terminal 91.

With the foregoing organization of the invention in mind, illustrative decision and error checking operations thereof may now be considered. For this purpose, it will be assumed that a decision is to be made based on a match between particular corresponding bits of the contents of data registers 20 and 30 and that this is a decision-normal operation, that is, that the normal instruction sequence of the processor is to be followed. It is further assumed that the check register 10 has its contents initially set to the all-zero state under control of circuitry of the data processing system not considered an essential part of this invention and not here considered. An illustrative contents of data register 20 in its storage cells and available at its single-rail outputs may be given as: 1, . . . 1,0,0. Similarly, an illustrative contents of data register 30 is given as: 0, . . . 1,1,0. In accordance with well-known logic circuit arrangements and conventional practice, the foregoing logical values appear on the respective output leads of the storage cells as follows: a storage cell containing a logical 1 will have its output lead designated as active or high, that is, it will have a particular voltage level present thereon; a storage cell containing a logical 0 will have its output lead designated as inactive or low, that is, it will be at substantially zero voltage.

During a first operative phase, the timing pulse source 40 is controlled to apply a $\phi_1$ enabling, high voltage pulse to one input of each of the NAND gates 21. As a result, in accordance with their logic operation, the outputs of the gates applied to corresponding toggle inputs of check register 10, will leave the contents of the latter register as follows: 0, . . . 0,1,1. During a second operative phase, the timing phase source 40 is controlled to apply a $\phi_2$ enabling voltage to one input of each of the NAND gates 31. As a result, the gating of the contents of register 30 to the check register 10 retoggles the bit positions of the matching bits of the registers 20 and 30 leaving the contents of the check register 10 as follows: 1, . . . 0,1,0, thus indicating that the contents of the corresponding bit positions 0 and 2 of the registers 20 and 30 matched. The bit or bits now stored in check register 10, which will serve as a basis for the illustrative decision operation being described, are under the control of the contents of mask register 50. Specifically, the presence of a logical 1 in a cell of the latter register determines that the contents of the corresponding cell of the check register 10 are to be observed. Conversely, the presence of a logical 0 in a cell of register 50 determines that the contents of the corresponding cell of register 10 are to be ignored. This control is exercised by means of the interconnections of the true and complement outputs of the mask and check registers 10 and 50 with the gates 11, 12, and 51 in the manner previously detailed.

As previously mentioned the contents of the bit storage cells 0 and 2 of the check register 10, after the match operation, will determine the decision outcome. Accordingly, for this operation, the mask register 50 contents are as follows: 0, . . . 1,0,1, and its double-rail outputs are correspondingly energized. Considering first the outputs of check register 10, since cell 0 contains a logical 0 because of the previous match, its true output will be inactive and its complement output will be active. The latter voltage condition is inverted at inverter 11-0 thereby making the collector of its output transistor low. The output of its companion inverter 12-0, on the other hand, is high since the complement output of cell 0 of register 50 is inactive or low. Being collector-tied, however, causes the sum output of gates 11-0 and 12-0 to be low and this low output is applied to one input of final stage NAND gate 60D-0. An identical output and for the same reasons is applied to one input of final stage NAND gate 60D-2 based on the contents of storage cells 2 of the check and mask registers 10 and 50.

The true outputs of the latter storage cells, rather than being applied to individual inputs of separate inverters, are combined at the input pairs of NAND gates 51-0 and 51-2, respectively. At the former gate, the true output from cell 0 of the check register 10 is low and the true output from the corresponding cell of register 50 is high. Accordingly, the output of gate 51-0 will be high. For the same reason, that is, the contents of cell 2 of the check and mask register 10 and 50, the output of gate 51-2 will also be high. Since one input of each of the remaining gates 51 from the other mask register storage cells is a low voltage condition, a high input is applied to the connected terminal of NAND gate 60C. Returning now to the inputs of the gates 60D from the inverters 11 and 12, it is evident from an examination of the bits stored in the remaining cells of the registers 10 and 50, that at least one inverter of each of the inverter pairs 11 and 12 will have a high input applied thereto. As a result, all of the inputs from these sources to the NAND gates 60D will be low or inactive. So far we have traced the logic operations to the inputs of the final stage decision gates 60C and 60D. At this point, in a $\phi_3$ operative phase, the TO bit field of the microprogram data register 70 is decoded by the decoder circuit 80 to steer an enabling voltage pulse, that is, a logical 1, to the latter gates. As the gates 60D are thereby enabled, a high voltage level appears at the outputs of each of these gates which voltage level is applied by a connecting common conductor and conductor 62 to an input of the S storage cell of the microprogram data register 70. At this point the storage circuit is arranged so that in view of the convention assumed, the S cell is not set when a 1 is applied thereto and is set when a 0 is applied. Since, in the illustrative operation being described, the input is a logical 1, the S cell is not set, a decision-normal state obtains and the normal instruction sequence of the data processor will be followed.

As a result of the foregoing logic operation, the contents of the S cell of register 70 remain unchanged, that is, in a state representative of a logical 0. A low voltage level condition will accordingly appear on an output of that cell, which output will be applied to an input of NAND gate 85 via the conductor 64. During the $\phi_3$ operative phase, the enabling voltage from the decoder circuit 80 is also applied to another input of gate 85 via conductor 84. As a result, the output of gate 85 is high, that is, a logical 1 is applied therefrom to an input of the 1-out-of-*n* check circuit 90. At the same time, as a result of the enabling of gate 60C, a low input is applied to circuit 90, thereby satisfying the condition for correct operation of the circuit of this invention that one and only one input conductor of the circuit is low at one time. As a result, no error indication appears on the output terminal 91 of circuit 90.

Another illustrative operation of the circuit of this invention in which a decision-alter state is generated may now be considered. For this purpose it will be assumed that the data registers 20 and 30 contain the same contents as that assumed in the foregoing decision-normal operation. However, it is here assumed that the contents of corresponding cells 1 and 2 of those registers are to be compared and that the decision is to be based on that comparison. The operation is initiated by the application of an enabling pulse from the timing pulse source 40 during the $\phi_1$ operative phase to the gates 21 to toggle the storage cells of check register 10 in accordance with the information contents of data register 20. The retoggling of the check register 10 during phase $\phi_2$ in accordance with the contents of data register 30 is accomplished in a manner identical to that described in the foregoing for the earlier operation. As a result, check register 10 again contains the contents: 1, . . . 0,1,0. The contents of mask register 50 will also be the same except for that of the storage cells 0 and 1; cell 0 will, in accordance with the operation being assumed, now contain a logical 0 and cell 1 will contain a logical 1 to determine that the contents of the corresponding cells in check register 10 are to be examined. Since by examination it is apparent that the contents of storage cells 2 of data registers 20 and 30 match, the true and complement outputs of the corresponding cells of mask register 50 and check register 10 will apply inputs to the gates 51-2, 11-2, and 12-2 as previously explained. These inputs will leave the output of gate 51-2 active or high and the collector-tied outputs of gates 11-2 and 12-2 low or inactive.

Mask register cell 0, now assumed to contain a logical 0, applies via its true output, the voltage state corresponding to that value to an input of gate 51-0, leaving the output of that gate again high or active. The output of inverter pair 11-0 and 12-0 is also unaffected by the change in contents of the mask register 50 and the collector-tied outputs are again inactive. In view of the comparison being made, the true output of cell 1 of mask register 50 is now high and its complement output is in a low voltage state. As a result and because of the high voltage level supplied by the true output of the corresponding cell of check register 10, the output of NAND gate 51-1 is now low. Since the outputs of gates 51 are collector-tied, the connected input of gate 60C will also be low. Another significant difference from the previous operation occurs as the result of the combination of the complement output of cell 1 of mask register 50 with the complement output of the corresponding cell of check register 10 at the inverter pair 11-1 and 12-1. Since the complement inputs to these inverters are both low, the output of the inverter pair is high, which in turn is applied to an input of NAND gate 60D-1. During the $\phi_3$ operative phase gates 60C and 60D are enabled by a timing pulse steered thereto by TO field decoder 80. As a result, since both inputs to the gate 60D-1 are high, its output will be low and because of the collector-ties of the outputs of the gates 60D, all of the latter will also be low. This low voltage condition is applied to the S storage cell of microprogram data register 70 causing the latter cell to be set to establish the fact the normal instruction sequence of the processor of the system is to be altered.

The high voltage level of the set cell S is transmitted via conductor 64 to one input of NAND gate 85 together with the enabling pulse fom decoder 80 via conductor 84. As a result, gate 85 at its output applies a low voltage input to 1-out-of-*n* error checking circuit 90. Since one input of gate 60C is low, its output will be active and this state is transmitted to error checking circuit 90 via conductor 61. The latter circuit fails to generate an output signal on its terminal 91 since the condition that one and only one of its inputs is low is satisfied, indicating that the decision operation just completed was error-free.

One further operation, mentioned earlier, is possible with the circuit of this invention, that is, an operation in which no decision is made. The result here is identical to that of a decision-normal operation: the normal instruction sequence of the processor is followed. In this operation the decision output is controlled by the all 0 contents of the mask register 50 independently of the contents of the check register 10. This is evident when it is recalled that the bits of check register 10 which were ignored in the afore-described operations had no effect on a decision outcome. Thus, a storage cell of mask register 50 having a logical 1 on its complement output (thereby determining that the bit stored in the corresponding cell of check register 10 is to be ignored) will cause the output of corresponding gate 60D to be high regardless of the output on the corresponding complement output of the register 10 cell. If all of the gates 60D outputs are high, from the foregoing manner of operation, it is clear that cell S of microprogram data register 70 will not be set and the normal instruction sequence will be followed.

During any particular logic operation as described in the foregoing, it will be appreciated that any of the hardware faults possible affecting the operation of the NAND and NOR logic circuit gates 51 and 11-12 and decision gates 60C and 60D will be detected at error checking circuit 90. Those faults not affecting the accuracy of a current decision operation, on the other hand, will not generate an error signal on terminal 91 of circuit 90 and such faults will not be disclosed until the accuracy of an operation is affected. Any gate, the output of which is stuck at logical 0, for example, will have no effect on a combined output with other gates to which it is collector-tied if any one of those other gates has a valid 0 output. Similarly, any gate, the output of which is stuck at logical 1, will have no effect on a combined output reguiring that all the individual outputs be high.

What has been described is considered to be only one specific illustrative embodiment of this invention and it is to be understood that various and numerous other arrangements may be devised by one skilled in the art without departing from the scope of the invention as defined by the appended claims. As an example, the NOR logic circuits made up of the individual inverters 11 and 12 in the foregoing description may readily comprise other circuit arrangements accomplishing the same logic functions. In practice, the availability of basic uniform logic circuits may frequently dictate the specific manner of accomplishing those functions.

What is claimed is:

1. A decision logic system comprising a check register having a plurality of data cells each having a true and a complement output, a mask register having a plurality of data cells each also having a true and a complement output, a plurality of first logic circuit means for individually combining said true outputs of said mask and check registers, respectively, in a NAND relationship for generating a plurality of true output signals, a plurality of second logic circuit means for individually combining said complement outputs of said mask and check registers, respectively, in a NOR relationship for generating a plurality of complement output signals, means for combining said true output signals in an AND relationship for generating an error-checking signal, and means for combining said complement output signals also in an AND relationship for generating a decision signal.

2. A decision logic system comprising a first register having a plurality of data cells each having a true and complement output representative of the contents of the cell, a second register having a plurality of data cells each also having a true and complement output representative of the contents of the cell, a plurality of NAND gate means each having a pair of inputs and an output, a plurality of NOR gate means each also having a pair of inputs and an output, the true outputs of corresponding cells of said first and second registers being applied respectively to the pair of inputs of each of said NAND gate means and the complement outputs of said corresponding cells of said first and second registers being applied respectively to the pair of inputs of each of said NOR gate means, first AND gate means having a plurality of inputs connected respectively to the outputs of said plurality of NAND gate means, and second AND gate means having a plurality of inputs connected respectively to the outputs of said plurality of NOR gate means.

3. A decision logic system comprising a first and a second data register each having a plurality of data storage cells, means for comparing the contents of corresponding cells of said first and second data register comprising a toggle check register having a plurality of data storage cells, a first and a second plurality of gating means for successively gating the contents of said plurality of data storage cells of said first and said second data register to the corresponding cells of said check register for toggling and retoggling said last-mentioned cells, each of the storage cells of said check register having a true and a complement output indicative of the contents of a cell, a mask register having a plurality of data storage cells each also having a true and a complement output indicative of the contents of a cell, a plurality of first logic circuit means for individually combining said true outputs of said mask and check registers, respectively, in a NAND relationship for generating a plurality of true output signals, a plurality of second logic circuit means for individually combining said complement outputs of said mask and check registers, respectively, in a NOR relationship for generating a plurality of complement output signals, and gating means for combining each plurality of said true output signals and said complement output signals in an AND relationship to generate, respectively, an error-checking signal and a decision signal.

4. A decision logic system according to claim 3 also comprising controlled means having a first and a second operative state determined responsive to said decision signal, said controlled means providing a state signal indicative of said operative state, and error-checking circuit means for generating an error signal responsive to said error-checking signal and a particular state signal for generating an error signal.

5. A decision logic system according to claim 4 in which said controlled means comprises a control kit storage cell of a program data register, the operative state of which determines the instruction sequence of a data processor.

6. A decision logic system comprising a check register having a plurality of data storage cells containing a plurality of binary check bits, each of said cells having a true and a complement output, means for selecting a decision pattern of said check bits comprising a mask register having a plurality of data storage cells containing a plurality of binary mask bits, each of said last-mentioned cells also having a true and a complement output, and a plurality of NOR logic circuit means each having a first input connected to a complement output of a corresponding cell of said check register and a second input connected to a complement output of a corresponding cell of said mask register and each having a single output, and an AND logic circuit means having a plurality of inputs connected respectively to said outputs of said NOR logic circuit means for generating a decision logic signal.

7. A decision logic system according to claim 6 in which said AND logic circuit means comprises a plurality of transistor NAND gates each having an input connected to an output of one of said NOR circuit means, the outputs of said NAND gates being collector-tied.

8. A decision logic system according to claim 6 also comprising a plurality of NAND logic circuit means each having a first input connected to a true output of a corresponding cell of said mask register and a second input connected to a true output of a corresponding cell of said check register and each having a single output and means for connecting the outputs of said NAND logic circuit means so that a single output signal is generated of a particular binary value if a signal of said particular binary value appears on any of said last-mentioned outputs of said plurality of NAND logic circuit means.

9. A decision logic system according to claim 8 also comprising apparatus controlled responsive to said decision logic signal for assuming a first and a second operative state and for generating a state signal indicative of said first and second state and circuit means operated responsive to said single output signal and said state signal for generating an error-checking signal.

10. In a data processing system, in combination, a first data register having a predetermined plurality of binary bits stored therein, a second data register having a predetermined second plurality of binary bits stored therein, a toggle check register having a plurality of storage cells each being initially in a clear state and each having a true and complement output indicative of the contents of the cell, means of toggling particular ones of said storage cells of said check register responsive to said first plurality of binary bits during one operative phase, means for retoggling said particular ones of said storage cells of said check register responsive to said second plurality of binary bits during another operative phase to leave particular check bits in said storage cells of said check register, means for selecting particular ones of said check bits as a condition for a logic decision comprising a mask register having a plurality of storage cells having a predetermined pattern of mask bits stored therein, each of said last-mentioned storage cells having a true and a complement output indicative of the contents of the cell, and a plurality of logic gating means for combining respectively corresponding complement outputs of the storage cells of said mask register and said check register for generating a plurality of NOR output signals; and a logic gating means for combining said NOR output signals in an AND relationship during a succeeding operative phase for generating a decision output signal.

11. In a data processing system, the combination as claimed in claim 10 also comprising a plurality of logic gating means for combining respectively corresponding true outputs of the storage cells of said mask register and said check register for generating a plurality of NAND output signals and means for combining said NAND output signals in an AND relationship during said succeeding operative phase for generating a check output signal.

12. In a data processing signal, the combination as claimed in claim 11 also comprising data processing controlled means operated responsive to said decision output signal to assume a first or a second operative state, said controlled means including means for generating a state signal indicative of one or the other of said operative states.

13. In a data processing system, the combination as claimed in claim 12 also comprising error-checking circuit means operated responsive to said check signal and said state signal for generating an error-checking signal.

14. In a data processing system, the combination as claimed in claim 13 in which said data processing controlled means comprises a program data register in which said first and second operative state determines the program instruction sequence of said system.

* * * * *

UNITED STATES PATENT OFFICE
CERTIFICATE OF CORRECTION

Patent No. 3,779,458 Dated December 18, 1973

Inventor(s) Herbert Yu-Pang Chang, Roger Alan Elliott, Daniel John Senese, and Thomas Loyd Smith It is certified that error appears in the above-identified patent and that said Letters Patent are hereby corrected as shown below:

Wherever it appears, "logical 1" should read --logical "1"--. Wherever it appears, "logical 0" should read --logical "0"--. Column 1, line 67, "no dicision made" should read --no decision made--. Column 2, lines 15 and 16, "to determined a" should read --to determine a--. Column 2, lines 48 and 49, "are multiplied together" should read --are multipled together--. Column 2, line 53, "similarly multiplied together" should read --similarly multipled together--. Column 3, line 2, "generate error signal" should read --generate an error signal--. Column 3, lines 53 and 54, "of character well" should read --of a character well--. Column 4, line 16, "...51-a" should read --...51-n.--. Column 5, line 6, "is applied is" should read --is applied as--. Column 5, line 46, "timing phase source" should read --timing pulse source--. Column 8, line 10, "pulse fom decoder" should read --pulse from decoder--. Column 10, line 10, "a control kit" should read --a control bit--. Column 10, line 62, "means of toggling" should read --means for toggling--. Column 12, line 4, "data processing signal" should read --data processing system--.

Signed and sealed this 18th day of June 1974.

(SEAL)
Attest:

EDWARD M.FLETCHER,JR.
Attesting Officer

C. MARSHALL DANN
Commissioner of Patents